(12) United States Patent
Chapman (10) Patent No.: US 10,746,547 B2
(45) Date of Patent: Aug. 18, 2020

(54) COMPASS ATTACHABLE TO HAT

(71) Applicant: Ryan George Chapman, Ontario (CA)

(72) Inventor: Ryan George Chapman, Ontario (CA)

( * ) Notice: Subject to any disclaimer, the term of this patent is extended or adjusted under 35 U.S.C. 154(b) by 238 days.

(21) Appl. No.: 15/987,849

(22) Filed: May 23, 2018

(65) Prior Publication Data

US 2019/0360807 A1  Nov. 28, 2019

(51) Int. Cl.
*G01C 17/28* (2006.01)
*A42B 1/24* (2006.01)

(52) U.S. Cl.
CPC .............. *G01C 17/28* (2013.01); *A42B 1/242* (2013.01)

(58) Field of Classification Search
CPC ......... G01C 17/28; G01C 17/02; G01C 17/10
USPC ...... 33/303, 333, 334, 347, 349, 354, 355 R
See application file for complete search history.

(56) References Cited

U.S. PATENT DOCUMENTS

| | | | | |
|---|---|---|---|---|
| 1,479,008 A * | 1/1924 | Powers | .............. | G04B 37/1433 224/152 |
| 2,494,278 A * | 1/1950 | Badovinac | ............... | A42B 1/24 33/370 |
| 4,141,152 A * | 2/1979 | White | .................... | G01C 17/20 33/262 |
| 4,953,304 A * | 9/1990 | Raitmaa | .................. | B63C 11/12 33/355 R |
| 5,187,871 A * | 2/1993 | McDermott | ............ | B63C 11/12 2/430 |
| 5,381,603 A * | 1/1995 | Lee | ......................... | G01C 17/30 33/349 |
| 6,282,802 B1 * | 9/2001 | Iden | ........................ | G01C 17/04 33/347 |
| 2005/0172504 A1 * | 8/2005 | Ohm | ........................ | B60R 1/12 33/355 R |
| 2007/0227020 A1 * | 10/2007 | Barany | ................ | A42B 3/0433 33/354 |
| 2008/0169998 A1 * | 7/2008 | Jacobsen | ............ | G02B 27/0172 345/8 |
| 2012/0050144 A1 * | 3/2012 | Morlock | ............... | G06T 19/006 345/8 |
| 2016/0238850 A1 * | 8/2016 | Yang | .................. | G02B 27/0176 |
| 2018/0249133 A1 * | 8/2018 | Thiel | .................. | H01M 2/0207 |

FOREIGN PATENT DOCUMENTS

CN  202653250  1/2013

* cited by examiner

*Primary Examiner* — Christopher W Fulton
(74) *Attorney, Agent, or Firm* — Argus Intellectual Enterprise; Daniel Enea; Jordan Sworen (57) ABSTRACT

A compass for attachment to a hat, particularly a brim of a hat. The compass includes a housing, an attachment-clip, at least one direction-sensor, a controller, a display-screen and a power-supply. In a preferred embodiment, the power-supply is a solar panel and a rechargeable battery. The compass is useful for attaching to the hat to allow hands-free use of the compass.

15 Claims, 6 Drawing Sheets

COMPASS ATTACHABLE TO HAT

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

1. Field of the Invention

The present invention relates generally to the field of compasses and more specifically relates to a compass for attachment to headwear.

2. Description of Related Art

A compass is an instrument used for navigation and orientation that shows direction relative to the geographic cardinal directions (or points). Usually, a diagram called a compass rose shows the directions north, south, east, and west on the compass face as abbreviated initials. When the compass is used, the rose can be aligned with the corresponding geographic directions; for example, the "N" mark on the rose points northward. Compasses often display markings for angles in degrees in addition to (or sometimes instead of) the rose. North corresponds to 0°, and the angles increase clockwise, so east is 90° degrees, south is 180°, and west is 270°.

A compass is typically held in a hand of a user whilst they are trying to navigate their way or establish a direction. This can be troublesome in situations where the user requires use of both of their hands whilst trying to navigate their way; for example, whilst hunting the user requires concentration towards a line of sight and use of both of their hands. The concentration and use of both of their hands is disrupted when the user needs to check their compass. Thus, a suitable solution is desired.

Chinese Pat/Pub. No. CN 202653250 to Licheng Ji relates to a cap with compass. The described cap with compass includes a cap body and a cap brim arranged on one side of the cap body, wherein the upper surface of the cap brim is provided with a compass. According to the cap with the compass, a user can observe and distinguish directions by effectively using the compass on the cap brim, and simultaneously, the compass can be conveniently carried, the cap is simple in structure, convenient to use and can bring great convenience to people.

BRIEF SUMMARY OF THE INVENTION

In view of the foregoing disadvantages inherent in the known compasses art, the present disclosure provides a novel compass attachable to hat. The general purpose of the present disclosure, which will be described subsequently in greater detail, is to provide a compass attachable to a hat such that the compass is viewable at an eye level of a user.

A compass is disclosed herein. The compass includes a housing which may include a first-surface and a second-surface. An attachment-clip may be secured to the housing and configured to attach the housing to the attachment-surface of the hat. At least one direction-sensor may be disposed within the housing and configured to sense a direction it may be facing and generate at least one direction-signal corresponding to a sensed direction. Further, a controller may be disposed within the housing and in communication with the at least one direction-sensor.

The controller may include a processor configured to receive the at least one direction-signal from the at least one direction-sensor and to generate at least one direction-file. A display-screen may be located on one of the first-surface and the second-surface of the housing and may be in communication with the at least one controller. In addition, the display-screen may be configured to display the at least one direction-file. Furthermore, a power-supply may be disposed within the housing and configured to provide power to the compass.

A method of using the disclosed compass is also disclosed herein. The method of using the present invention may comprise the steps of: providing the compass as above; attaching the compass to the attachment-surface of the hat via the attachment-clip; placing the hat on a users' head; unfolding the housing into an unfolded-state, such that the display-screen may be substantially level with eyes of the user; and viewing the direction-file on the display-screen to determine a direction of travel.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, a compass attachable to hat, constructed and operative according to the teachings of the present disclosure.

The various embodiments of the present invention will hereinafter be described in conjunction with the appended drawings, wherein like designations denote like elements.

DETAILED DESCRIPTION

As discussed above, embodiments of the present disclosure relate to compasses and more particularly to a compass attachable to hat as used to improve the use of the compass as attached to a hat/headwear.

Generally, disclosed is a hands-free compass that may be attached to clothing with visibility of direction facing at eye level. The compass may be attached to virtually any hat brim. The compass may be folded out of the way and turn off when folded; the compass may then turn back on when folded back to eye level. The compass may include a housing which may be approximately 3×2 inches in size. The housing may include clip to removably attach the compass to the hat brim. Further, a digital LED display may be located on the compass with an easy to read screen for the user. The housing may include a power supply which may be a solar panel and a rechargeable lithium battery to provide backup to power generated by the solar panel.

The compass may include multiple modes. Examples may include an on/off/stand by switch; N/NE/SE/S/SW/W/NW read outs; true north; degrees; range; latitude and longitude; Pingable; GPS, etc. The hands-free compass may be used by hunters, fishermen, hikers, campers, canoers, etc. In particular, the degrees mode may be useful for forestry, surveyors, loggers, etc. The range mode may be useful for hunters— particularly bow hunting or rifle hunting. Further, the range mode may be useful for golfers. Longitude and latitude may be particularly useful for police or search and rescue, along with the GPS mode.

Referring now more specifically to the drawings by numerals of reference, there is shown in FIGS. 1-6, various views of a compass 100.

Figure 1:
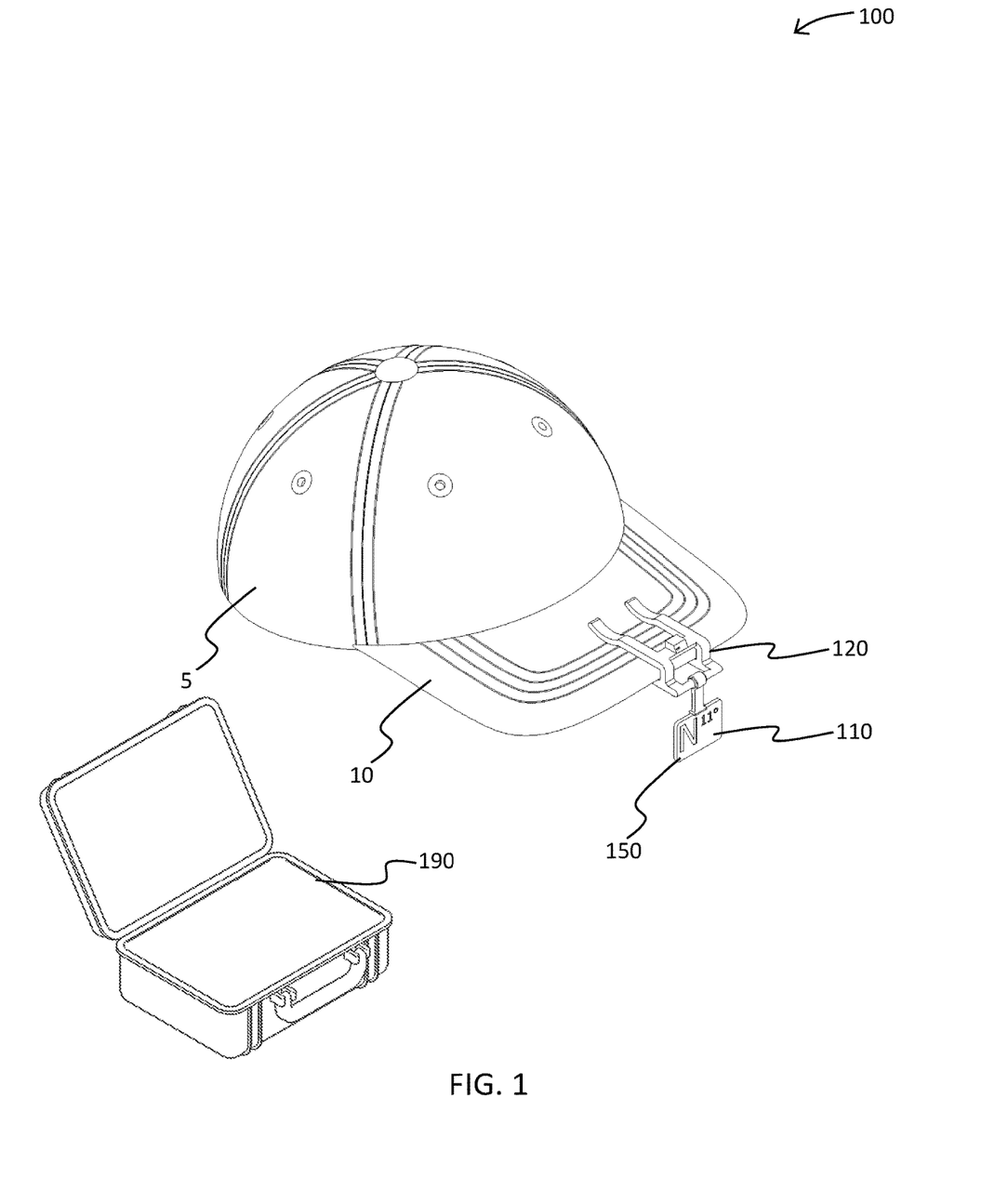
FIG. 1 is a front-side perspective view of the compass during an 'in-use' condition, according to an embodiment of the disclosure.

FIG. 1 shows a compass 100 during an 'in-use' condition 150, according to an embodiment of the present disclosure. As illustrated, the compass 100 may include a housing 110, an attachment-clip 120, at least one direction-sensor 130 (FIG. 3), a controller 140 (FIG. 3), a display-screen 150 and a power-supply 160 (FIGS. 4A-4B). As shown, the compass 100 may be used for attachment to a hat 5. The hat 5 may include an attachment-surface 10 (shown to be a hat 5 brim in this figure). Further, the compass 100 may comprise a carrying case 190 to store the compass 100 therein. The carrying case 190 may be made of a highly durable material such as copolymer polypropylene.

Figure 2A:
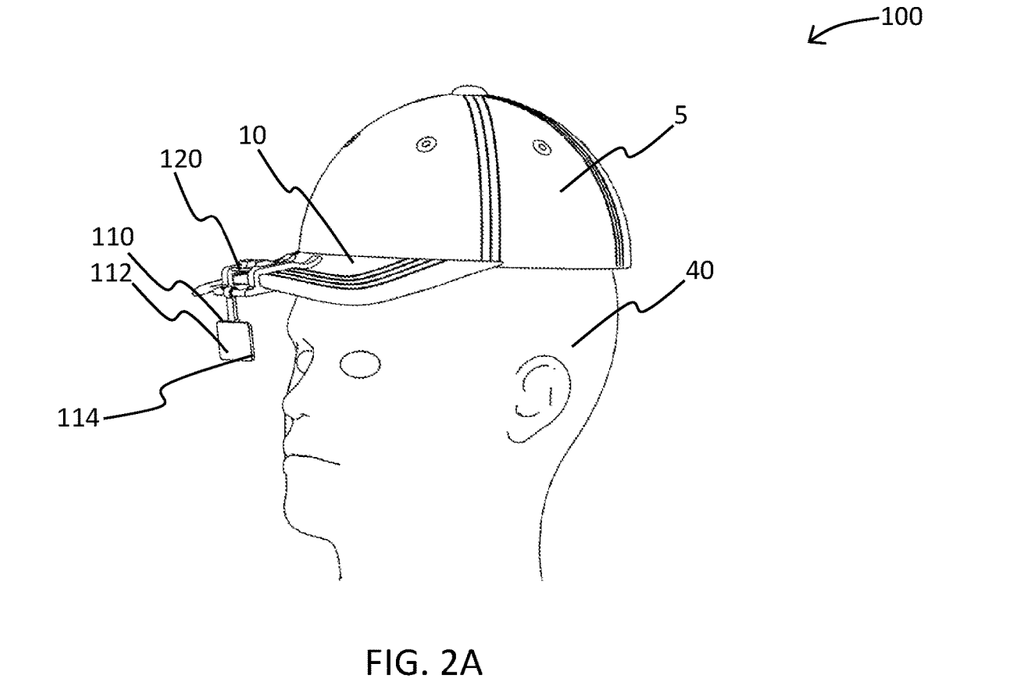
FIG. 2A is a front-side perspective view of the compass of FIG. 1, according to an embodiment of the present disclosure.
Figure 2B:
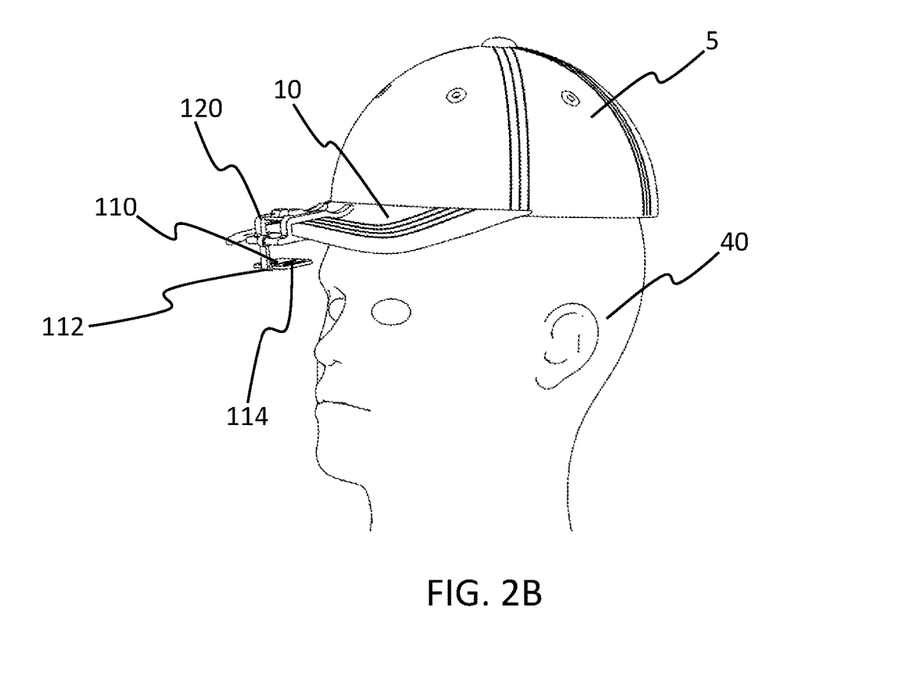
FIG. 2B is another front-side perspective view of the compass of FIG. 1, according to an embodiment of the present disclosure.

Referring now to FIGS. 2A-2B showing a front-side perspective views of the compass 100 of FIG. 1, (in-use and non-use, respectively) according to an embodiment of the present disclosure. The housing 110 may include a first-surface 112 and a second-surface 114. Further, the housing 110 may include a folded-state and an unfolded-state. As shown, the unfolded-state may include the display-screen 150 (FIGS. 4A-4B) being substantially level with a user 40s' eyes line when the hat 5 is worn by the user 40. Further, the folded-state may include the compass 100 being substantially out of the users' eye line when the hat 5 is worn by the user 40. As shown here, the attachment-clip 120 may be secured to the housing 110 and configured to attach the housing 110 to the attachment-surface 10 of the hat 5. The attachment-clip 120 may be a clamp configured to clamp the attachment-surface 10 of the hat 5 and tighten to secure the compass 100 to the hat 5. It should also be appreciated that 5 other attachment-means are contemplated.

In a preferred embodiment, the housing 110 may be completely waterproof/weatherproof to allow for use of the compass 100 in storms, for submerging under water, etc. Further, the housing 100 may be substantially transparent to prevent obstruction of the users 40 view when the compass 100 is in the unfolded-state. Various colors are contemplated for the attachment-clip 120. For example, in one embodiment the attachment-clip 120 may be a camouflage color.

Figure 3:
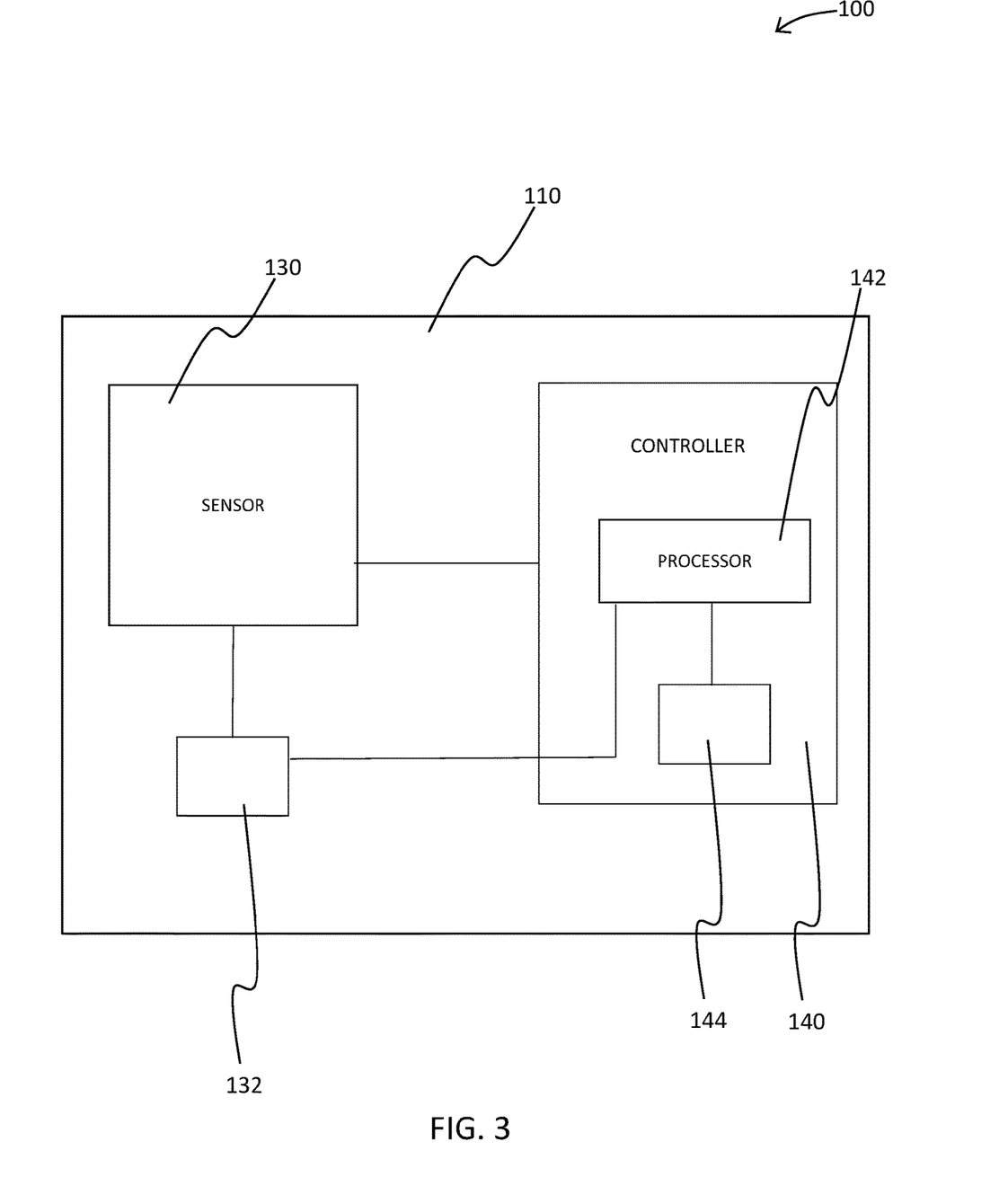
FIG. 3 is a front perspective view of the compass of FIG. 1, according to an embodiment of the present disclosure.
Figure 4A:
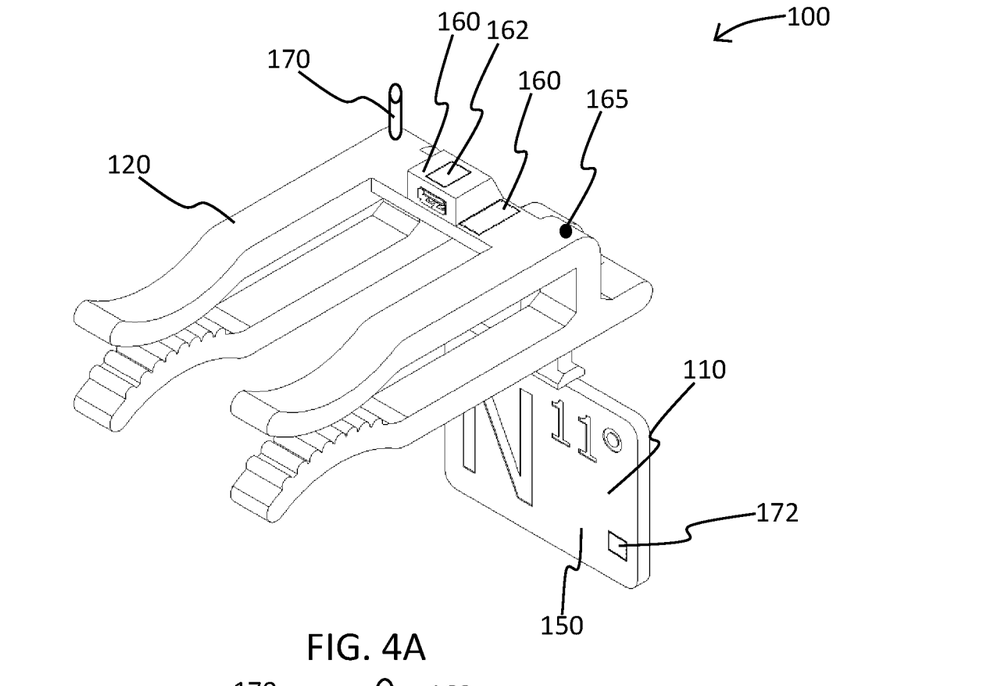
FIG. 4A is a rear-side perspective view of the compass of FIG. 1, according to an embodiment of the present disclosure.
Figure 4B:
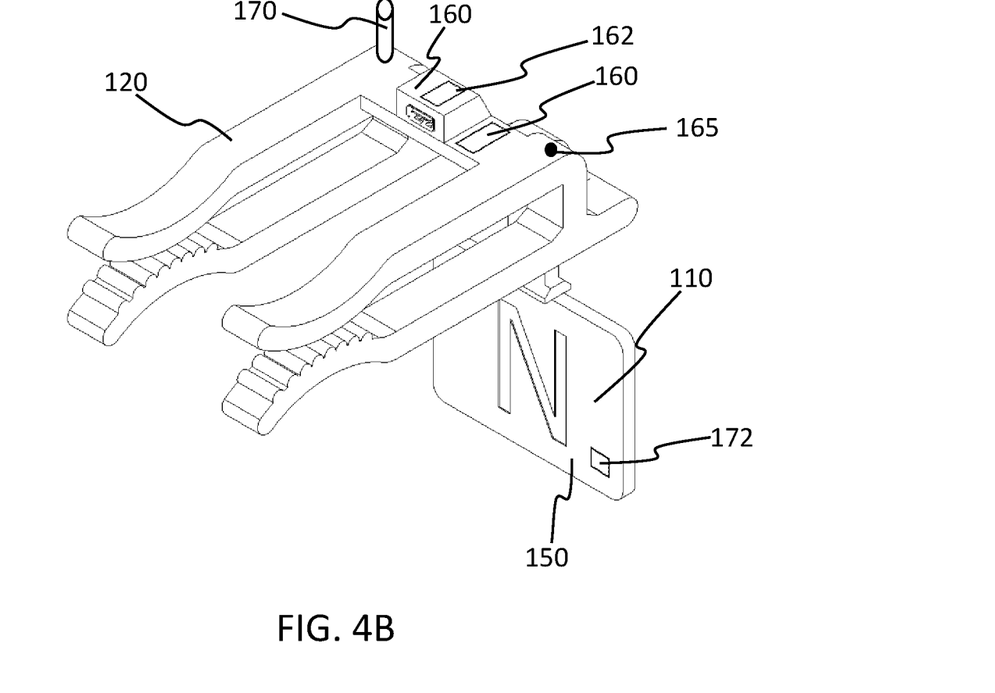
FIG. 4B is a rear-side perspective view of the compass of FIG. 1, according to an embodiment of the present disclosure.

FIG. 3 shows a front perspective view of the compass 100 of FIG. 1, according to an embodiment of the present disclosure. The at least one direction-sensor 130 may be disposed within the housing 110 and configured to sense a direction it is facing and generate at least one direction-signal 132 corresponding to a sensed direction. In a preferred embodiment, the at least one direction-sensor 130 may be a magnetometer. In this embodiment, the compass 100 may include two or three magnetic field sensors that provide data for a processor 142. Further, the compass 100 may output either a digital or analog signal proportional to its orientation. This signal may be interpreted by the controller 140 and either used internally or sent to the display-screen 150. The at least one direction-sensor 130 sensor may use highly calibrated internal electronics to measure the response of the device to the Earth's magnetic field.

The controller 140 may be disposed within the housing 110 and in communication with the at least one direction-sensor 130. The controller 140 may include the processor 142 configured to receive the at least one direction-signal 132 from the at least one direction-sensor 130 and to generate at least one direction-file 144. The controller 140 may be on a single integrated circuit embedded into the housing 110. The controller 140 may further comprise one or more processor 142 cores along with memory and programmable input/output peripherals. The program memory may be ferroelectric RAM, NOR flash, OTP ROM, etc.

Referring now to FIGS. 4A-4B showing a rear-side perspective view of the compass 100 of FIG. 1, according to an embodiment of the present disclosure. The compass 100 may further comprise a rangefinder 165 in communication with the controller 140 (FIG. 3). The rangefinder 165 may be used to measure distance from the user 40 to a target. For example, in hunting the user 40 may be measure a distance from the user 40 to an object being hunted. A wide range of range-finding means are contemplated. For example, the rangefinder 165 may be laser, radar, sonar, lidar, ultrasonic, etc.

Further, the compass 100 may comprise a Global positioning system 170 (GPS) system in communication with the controller 140 (FIG. 3). In this embodiment, the housing 110 may include one or more antennae mounted thereon. The GPS system 170 may determine latitude, longitude and altitude of the user 40 as well as cardinal directions. The GPS system 170 may have the ability to determine the position of the compass 100 on Earth, its speed and true bearing of its direction. Thus, the compass 100 may be particularly useful for determining true north as opposed to magnetic north.

In the preferred embodiment, a mode-button 172 may be provided and configured to switch between a plurality of modes such as the on/off/stand by switch; N/NE/SE/S/SW/W/NW read outs; true north; degrees; range; latitude and longitude; pingable; GPS, etc., as mentioned above. In this embodiment, the display-screen 150 may be configured to display each of the plurality of modes. A first mode displayed when the compass is first switched on may be one of the N/NE/SE/S/SW/W/NW read outs. Upon actuation of the mode-button 172 a second mode may display the readouts as above, along with the degrees. For example, the display-screen 150 may display "N" for "North" in the first mode, and "N" and "11°" in the second mode.

A further mode contemplated is a camera mode. In this embodiment, the compass 100 may include a camera integrated into one of the first-surface 112 and the second-surface 114. The camera may be configured to capture images or videos. In one embodiment, the controller 140 may include an internal memory configured to store the images or videos. In another embodiment, the compass may include a slot for receiving an external memory-device. Further, in one embodiment, the camera mode may be switched on via the mode-button 172. In another embodiment, the camera mode may be automatically switched on upon sensing movement.

Further, the power-supply 160 may be disposed within the housing 110 and configured to provide power to the compass 100. In the preferred embodiment, the power supply may include a rechargeable battery. This rechargeable battery may be lithium-ion or lithium-ion polymer. However, other batteries may be used such as disposable batteries. Further, the power-supply 160 may include at least one solar panel connected to the housing 110 and configured to provide solar power to the compass 100.

In a preferred embodiment, the unfolded-state may include the power-supply 160 being turned on. Similarly, the folded-state further may include the power-supply 160 being turned off. For example, the user 40 may fold the compass 100 out of their sight and the power-supply 160 may automatically turn off to conserve battery. When needed, the user 40 may unfold the compass 100 into their line of sight and the power-supply 160 may automatically turn on to prevent the user 40 from having to use their hands to switch the power-supply 160 on. In some embodiments, the compass 100 may further comprise a power-button 162 configured to selectively turn off the power-supply 160, and selectively turn on the power-supply 160 as desired. This power-button 162 may be particularly useful when the compass 100 is removed from the hat 5 and does not need to be unfolded/folded.

Figure 5:
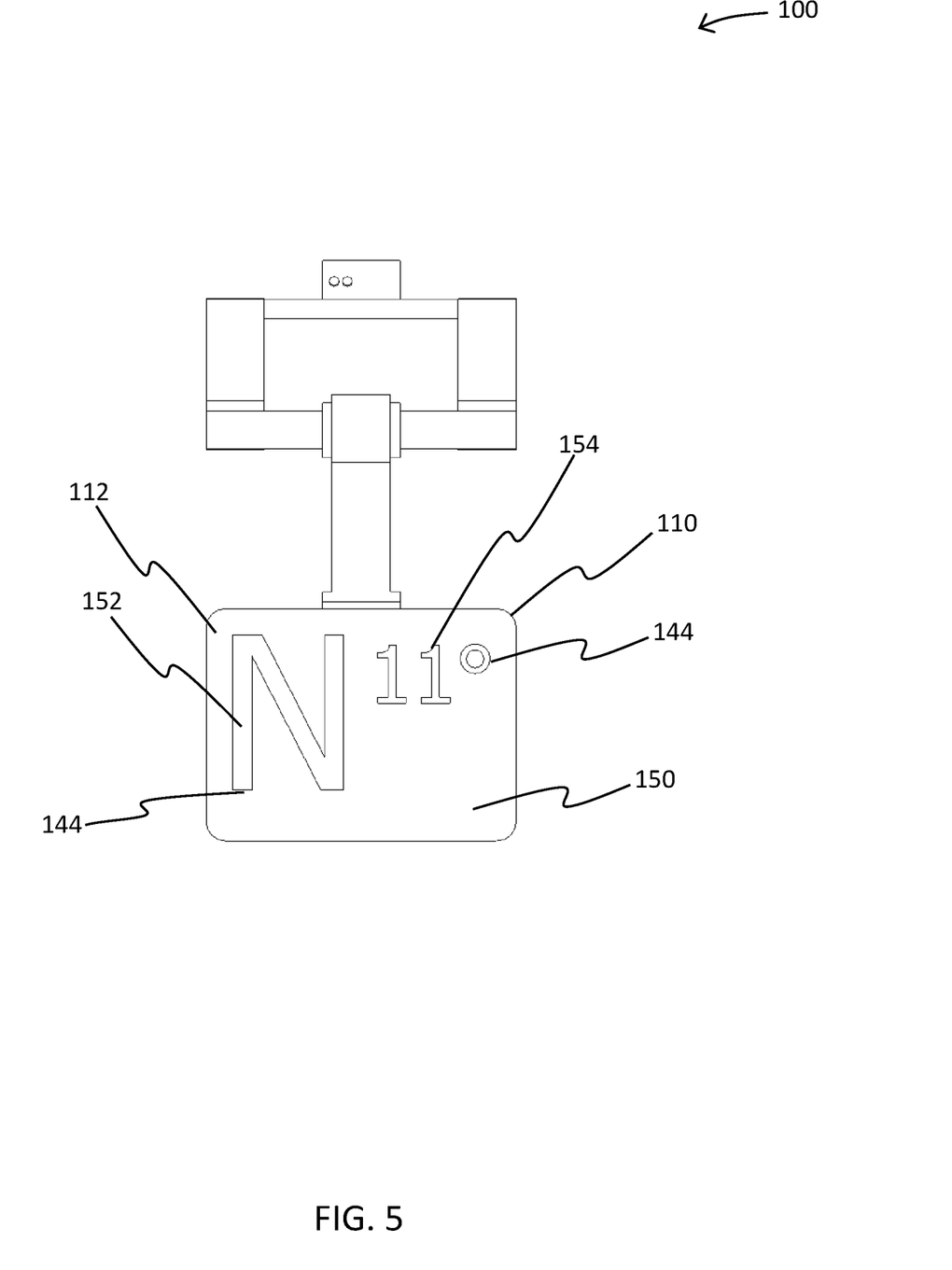
FIG. 5 is a front perspective view of the compass of FIG. 1, according to an embodiment of the present disclosure.

Referring now to FIG. 5 showing a front perspective view of the compass 100 of FIG. 1, according to an embodiment of the present disclosure. As shown, the display-screen 150 may be located on one of the first-surface 112 and the second-surface 114 of the housing 110 and may be in communication with the at least one controller 140 (FIG. 3). In the preferred embodiment, the display-screen 150 may be a digital LED display. Different examples of LED display screens may be contemplated. Further, other display options are contemplated. Examples may include projectors, head-mounted displays, etc. In addition, display options contemplated include new advancements in technology not currently known. In the preferred embodiment the display-screen 150 may be substantially transparent (as with the housing 100) to prevent obstruction of the users' 40 view when the compass 100 is in the unfolded-state. In this example the display-screen 150 may utilize technology seen in optical head-mounted displays, heads-up displays, and the like. Further, in one example, the display-screen 150 may be made from a glass-material.

Further, as shown, the display-screen 150 may be configured to display the at least one direction-file 144. The at least one direction-file 144 may include a corresponding direction-initial 152 and the display-screen 150 is configured to display the directional-initial 152. As shown, the at least one direction-file 144 may include eight said direction-files and eight corresponding said direction-initials 152. For example, the eight said direction-files may be cardinal points of N, E, S, W, along with intercardinal points of NE, SE, SW, and NW, each corresponding to the direction they denote. For example, if the direction sensed is North, the display-screen 150 may display the direction-initial 152 "N".

Further, the at least one direction-file 144 may further include a corresponding degree-number 154 and the display-screen 150 may be configured to display the corresponding said degree-number 154. In this embodiment, the corresponding degree-numbers 154 may include 0 degrees-359 degrees each corresponding to the direction they denote. For example, if the direction sensed is North East, the display-screen 150 may display the degree-number 154 "45°".

Figure 6:
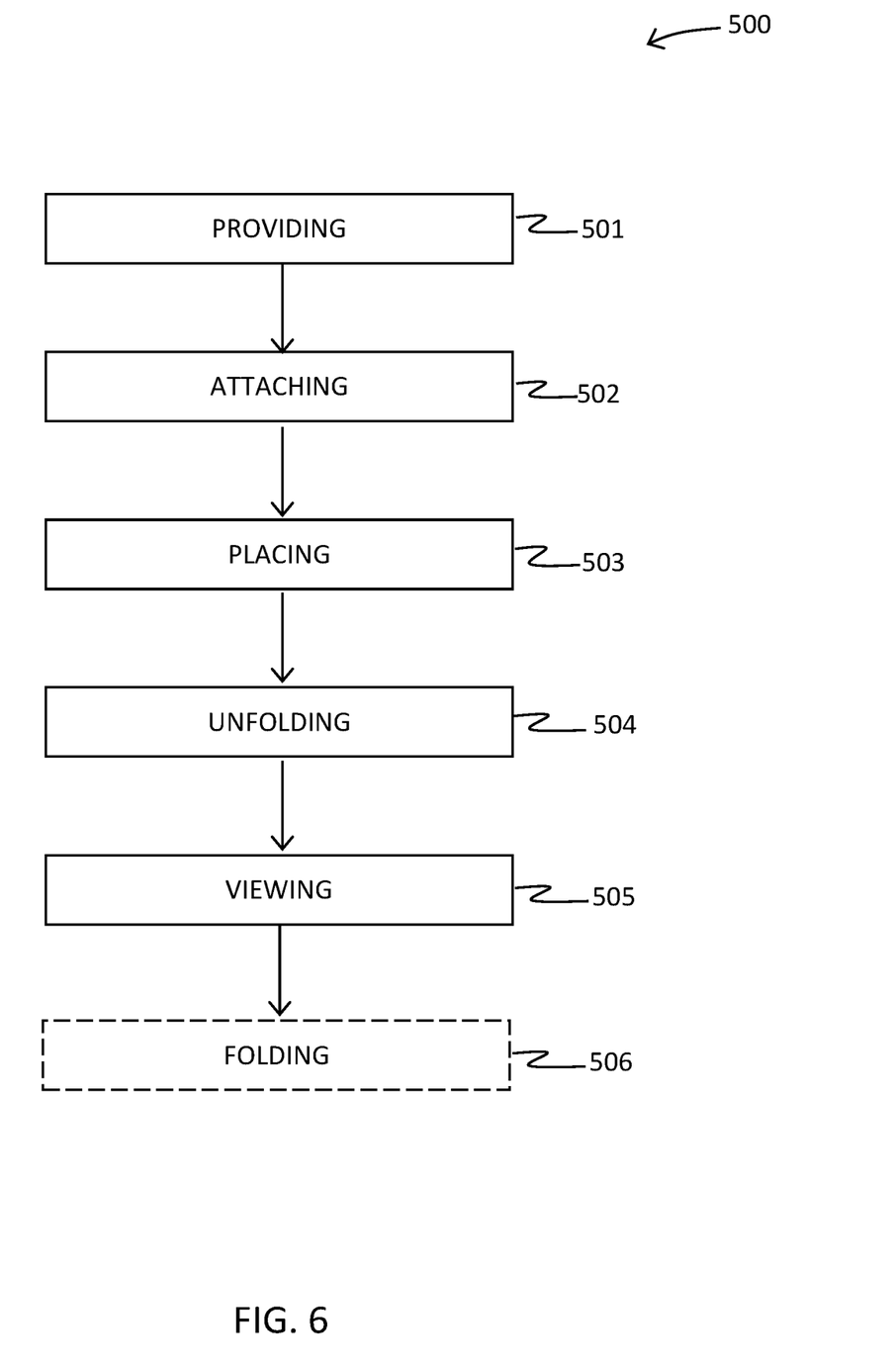
FIG. 6 is a flow diagram illustrating a method of use for a compass, according to an embodiment of the present disclosure.

FIG. 6 is a flow diagram illustrating a method of using a compass for attachment to a hat 600, according to an embodiment of the present disclosure. As illustrated, the a method of using a compass for attachment to a hat 600 may include the steps of: step one 601, providing the compass 100 as above; step two 602, attaching the compass 100 to the attachment-surface 10 of the hat 5 via the attachment-clip 120 or other suitable means; step three 603, placing the hat 5 on a user's 40 head; step four 604, unfolding the housing 110 into an unfolded-state, such that 5 the display-screen 150 is substantially level with eyes of the user 40; and step five 605, viewing the direction-file on the display-screen 150 to determine a direction of travel. A further step may include: step six 606, folding the housing 110 into the folded-state.

It should be noted that step six 606 is an optional step and may not be implemented in all cases. Optional steps of method of use 500 are illustrated using dotted lines in FIG. 6 so as to distinguish them from the other steps of method of use 500. It should also be noted that the steps described in the method of use can be carried out in many different orders according to user preference. The use of "step of" should not be interpreted as "step for", in the claims herein and is not intended to invoke the provisions of 35 U.S.C. § 112(f). It should also be noted that, under appropriate circumstances, considering such issues as design preference, user preferences, marketing preferences, cost, structural requirements, available materials, technological advances, etc., other methods for compass 100 (e.g., different step orders within above-mentioned list, elimination or addition of certain steps, including or excluding certain maintenance steps, etc.), are taught herein.

Upon reading this specification, it should be appreciated that, under appropriate circumstances, considering such issues as user preferences, design preference, structural requirements, marketing preferences, cost, available materials, technological advances, etc., other compass arrangements such as, for example, non-digital compasses, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A compass for attachment to a hat, the hat including an attachment-surface, the compass comprising:
   a housing including a first-surface and a second-surface;
   an attachment-clip secured to the housing, the attachment-clip configured to attach the housing to the attachment-surface of the hat;
   at least one direction-sensor disposed within the housing, the at least one direction-sensor configured to sense a direction it is facing and generate at least one direction-signal corresponding to a sensed direction;
   a controller disposed within the housing and in communication with the at least one direction-sensor, the controller including a processor configured to receive the at least one direction-signal from the at least one direction-sensor and to generate at least one direction-file;
   a display-screen located on one of the first-surface and the second-surface of the housing, the display-screen being in communication with the at least one controller, and wherein the display is configured to display the at least one direction-file;
   wherein the display-screen is adapted for display on a central portion of the attachment-surface of the hat so as to not interfere with a user's periphery view;
   wherein the display-screen is adapted to display both a direction-initial selected from eight direction-initials and a corresponding degree-number, simultaneously;
   wherein the corresponding degree-number is corresponding to the direction-initial by being distinctly within a range of each of the eight direction-initials;
   a power-supply disposed within the housing, the power-supply being configured to provide power to the compass.

2. The compass of claim 1, wherein the attachment-clip is semi-permanently affixed to the attachment-surface of the hat, wherein the attachment-surface of the hat is a front brim, such that the compass is repositionable along the front brim;
   wherein the attachment-clip comprises a pair of jaws having channels adapted to receive the attachment-surface of the hat;
   wherein the housing is movable between a folded-state and an un-folded state;
   wherein the un-folded state the housing is generally perpendicular from the attachment-clip being substantially level with a user's eye line when the hat is worn by the user;
   wherein the folded-state the housing is generally parallel to the attachment-clip being substantially out of the user's eye line when the hat is worn by the user.

3. The compass of claim 1, wherein the at least one direction-sensor is a magnetometer.

4. The compass of claim 1, further comprising a mode-button configured to switch between a plurality of modes, and wherein the display-screen is configured to display each of the plurality of modes.

5. The compass of claim 1, further comprising a rangefinder in communication with the controller.

6. The compass of claim 1, further comprising a Global Positioning System in communication with the controller.

7. The compass of claim 1, wherein the power supply includes a rechargeable battery.

8. The compass of claim 7, wherein the power supply further includes at least one solar panel.

9. The compass of claim 1, wherein the display-screen is a digital LED display.

10. The compass of claim 1, further comprising a power-button configured to selectively turn off the power-supply, and selectively turn on the power-supply as desired.

11. The compass of claim 1, wherein the unfolded-state includes the power-supply being turned on.

12. The compass of claim 11, wherein the folded-state further includes the power-supply being turned off.

13. A compass for attachment to a hat, the hat including an attachment surface, the compass comprising:
    a housing including a first-surface and a second-surface;
    an attachment-clip secured to the housing, the attachment-clip configured to attach the housing to the attachment-surface of the hat;
    at least one direction-sensor disposed within the housing, the at least one direction-sensor configured to sense a direction it is facing and generate at least one direction-signal corresponding to a sensed direction;
    a controller disposed within the housing and in communication with the at least one direction-sensor, the controller including a processor configured to receive the at least one direction-singal from the at least one direction-sensor and to generate at least one direction-file;
    a display-screen located on one of the first-surface and the second-surface of the housing, the display-screen being in communication with the at least one controller, and wherein the display is configured to display the at least one direction-file;
    wherein the display-screen is adapted for display on a central portion of the attachment-surface of the hat so as to not interfere with a user's periphery view;
    wherein the display-screen is adapted to display both a direction-initial selected from eight direction-initials and a corresponding degree-number, simultaneously;
    wherein the corresponding degree-number is corresponding to the direction-initial by being distinctly within a range of each of the eight direction-initials;
    a power-supply disposed within the housing, the power-supply being configured to provide power to the compass;
    wherein the attachment-clip is semi-permanently affixed to the attachment-surface of the hat, wherein the attachment-surface of the hat is a front brim, such that the compass is repositionable along the front brim;
    wherein the attachment-clip comprises a pair of jaws having channels adapted to receive the attachment-surface of the hat;
    wherein the housing is movable between a folded-state and an un-folded state;
    wherein the un-folded state the housing is generally perpendicular from the attachment-clip being substantially level with a user's eye line when the hat is worn by the user;
    wherein the folded-state the housing is generally parallel to the attachment-clip being substantially out of the user's eye line when the hat is worn by the user;
    wherein the at least one direction-sensor is a magnetometer;
    wherein the compass further comprises a mode-button configured to switch between a plurality of modes, and wherein the display-screen is configured to display each of the plurality of modes;
    wherein the compass further comprises a rangefinder in communication with the controller;
    wherein the compass further comprises a Global Positioning System in communication with the controller;
    wherein the power supply includes a rechargeable battery;

wherein the power supply further includes at least one solar panel;

wherein the display-screen is a digital LED display.

14. A method of using a compass for attachment to a hat, the hat including an attachment-surface, the method comprising:
 providing the compass for attachment to the hat, the compass including:
  a housing including a first-surface and a second-surface;
  an attachment-clip secured to the housing, the attachment-clip configured to attach the housing to the attachment-surface of the hat;
  at least one direction-sensor disposed within the housing, the at least one direction-sensor configured to sense a direction it is facing and generate at least one direction-signal corresponding to a sensed direction;
  a controller disposed within the housing and in communication with the at least one direction-sensor, the controller including a processor configured to receive the at least one direction-signal from the at least one direction-sensor and to generate at least one direction-file;
  a display-screen located on one of the first-surface and the second-surface of the housing, the display-screen being in communication with the at least one controller, and
   wherein the display is configured to display the at least one direction-file;
  wherein the display-screen is adapted for display on a central portion of the attachment-surface of the hat so as to not interfere with a user's periphery view;
  wherein the display-screen is adapted to display both a direction-initial selected from eight direction-initials and a corresponding degree-number, simultaneously;
  wherein the corresponding degree-number is corresponding to the direction-initial by being distinctly within a range of each of the eight direction-initials;
  a power-supply disposed within the housing, the power-supply being configured to provide power to the compass;
 attaching the compass to the attachment-surface of the hat via the attachment-clip;
 placing the hat on a users' head;
 unfolding the housing into an unfolded-state, such that the display-screen is substantially level with eyes of the user; and
 viewing the direction-file on the display-screen to determine a direction of travel.

15. The method of claim 14, further comprising:
 folding the housing into the folded-state.

* * * * *